United States Patent [19]

Yang

[11] Patent Number: 4,876,487

[45] Date of Patent: * Oct. 24, 1989

[54] LOW VOLTAGE ILLUMINATING LAMP SET WITH PROGRAMMABLE OUTPUT FOR GARDEN USE

[76] Inventor: Jerry S. C. Yang, 5-1 Tay Pyng St., Shi Hwu Jenn, Jang Huah Shiann, Taiwan

[*] Notice: The portion of the term of this patent subsequent to Jun. 3, 2003 has been disclaimed.

[21] Appl. No.: 208,801

[22] Filed: Jun. 20, 1988

Related U.S. Application Data

[60] Continuation of Ser. No. 850,552, Apr. 11, 1986, abandoned, which is a division of Ser. No. 377,170, May 11, 1982, Pat. No. 4,593,234.

[51] Int. Cl.$^4$ .............................................. H02B 1/08
[52] U.S. Cl. ..................................... 315/362; 315/294; 315/360
[58] Field of Search ............... 315/362, 316, 360, 314, 315/312, 307, 292, 294, 323; 340/309.4, 309.15, 679, 332

[56] References Cited

U.S. PATENT DOCUMENTS

| | | | |
|---|---|---|---|
| 4,151,515 | 4/1979 | Pease et al. | 315/293 |
| 4,153,860 | 5/1979 | Vonick | 315/159 |
| 4,198,563 | 4/1980 | Elssner | 315/360 |
| 4,209,728 | 6/1980 | Membreno | 315/159 |
| 4,240,011 | 12/1980 | Dinges et al. | 315/294 |
| 4,242,614 | 12/1980 | Vatis et al. | 315/294 |
| 4,249,160 | 2/1981 | Chivers | 315/159 |
| 4,292,570 | 9/1981 | Engel | 315/307 |
| 4,349,748 | 9/1982 | Goldstein et al. | 315/360 |
| 4,354,120 | 10/1982 | Schornack | 315/360 |
| 4,593,234 | 6/1986 | Yang | 315/362 |

Primary Examiner—Leo H. Boudreau
Assistant Examiner—Michael Razavi
Attorney, Agent, or Firm—Cushman, Darby & Cushman

[57] ABSTRACT

This invention is for the low voltage illuminating lamp set with the programmable output for Garden use which is used to control the lamp set in the Garden. The main feature is by the control device to preset the variation of time, and the brightness of the graden lamp set in the program. It is to initiated by the light of neighboring environment or to switch off the power, or by the presetting time through light sensitive switch under the condition that the power on/off is determined by the signal of light variation. This has been further characterized that the alarming signal is to be given in sound or in light before the cutoff of power for the warning of night wanderers to go away. These lamp sets can be in multiple parallel and with the function of each lamp set in separate brightness by the adjustable features.

15 Claims, 12 Drawing Sheets

PHOTO SENSOR

PHOTO SENSOR

Fig. 26

LOW VOLTAGE ILLUMINATING LAMP SET WITH PROGRAMMABLE OUTPUT FOR GARDEN USE

This is a continuation of application Ser. No. 850,552, filed Apr. 11, 1986, now abandoned, which is a division of Ser. No. 377,170, filed May 11, 1982.

BACKGROUND OF THE INVENTION

The illuminating lamp set in general garden is started up or turned off by adopting continuous movable timer, however this type of timer while the power is interrupted (such as power blackout) and afterwards the presetting time would be inaccurate and nreded to be readjusted for setting. Moreover the light variation by the timer is monotonous without sense of beauty and affection.

DETAILED DESCRIPTION OF PREFERRED EMBODIMENT

Figure 1:
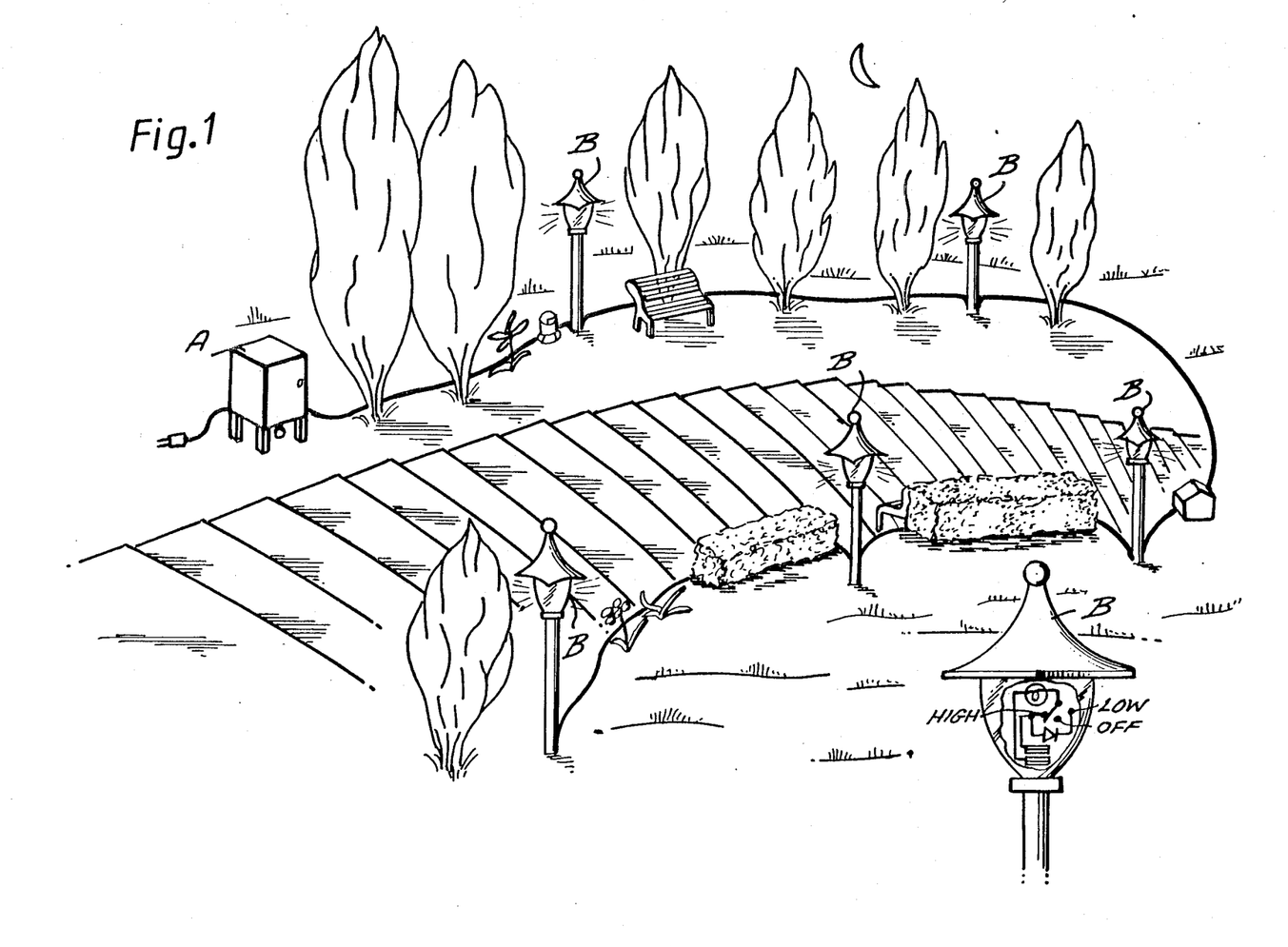
FIG. 1 is a practical example in this invention.
Figure 2:
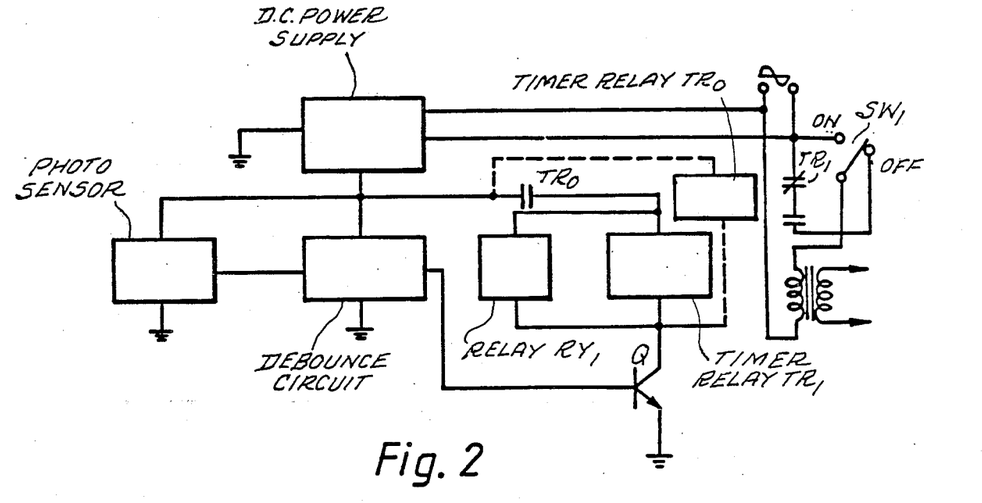
FIG. 2 is a block drawing to examplify the preset time in switching on the light in this invention.
Figure 3:
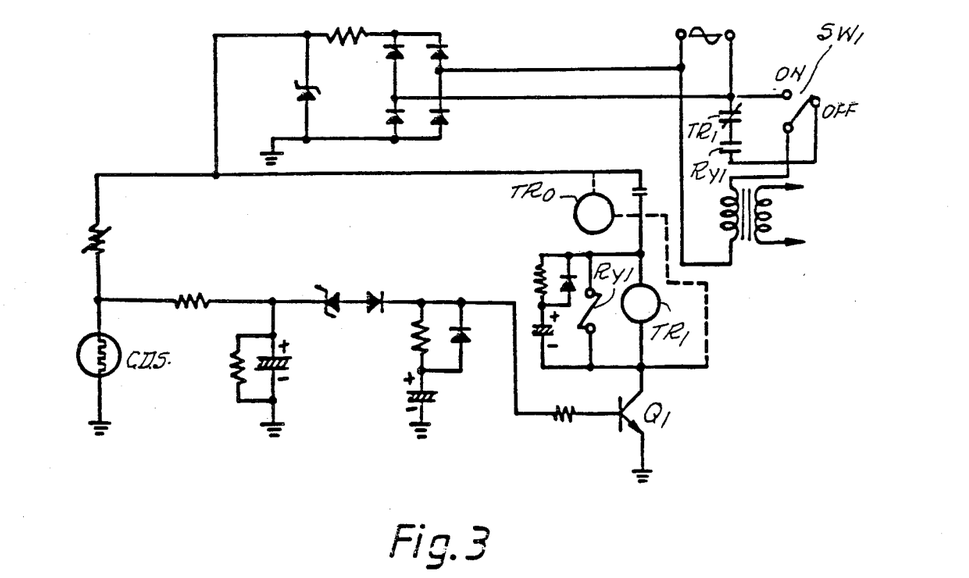
FIG. 3 is the drawing on circuits.

This invention has provided the low voltage illuminating lamp set with the programmable output for the gardens which has illiminated the shortcoming of the traditional garden illuminating lamp set, herewith attached are the practical example as follows:

The lamp set of this invention includes mainly the control device (A), with the brightness variation function pertaining to lamp set (B) and the combined organizational elements etc as shown in FIG. 1 as follows:

(A) Control Device: The starting method of the control device of this invention is divided into the light initiation of timing function, light starting and continuous timing setting as the example in the following:

(a) FIG. 2 shows the practical block diagram of time-setting starting method with the light initiation function. FIG. 3 shows the circuit diagram with DC control source and light detecting device to detect the light status in the garden, after the sunset without absorbing ight, the signal will feed to the debounce circuit to drive the relay RY1 after recognization and the timer TR1 will be energized to cause the timer's NC contract and RY1 NO contact to be in series with the load transformer to be energized and to cause the lamp sets at secondary side in parallel illuminated. When the timer reaches at the setting time, the power will be turned off, This invention has designed further with two timers TRo and TR1. TRo is used when absorbing light after a time delay to drive RY1 and TR1 for load transformer to deliver power, as shown in the figure SW1 is used for manual operating to deliver the power.

Figure 4:
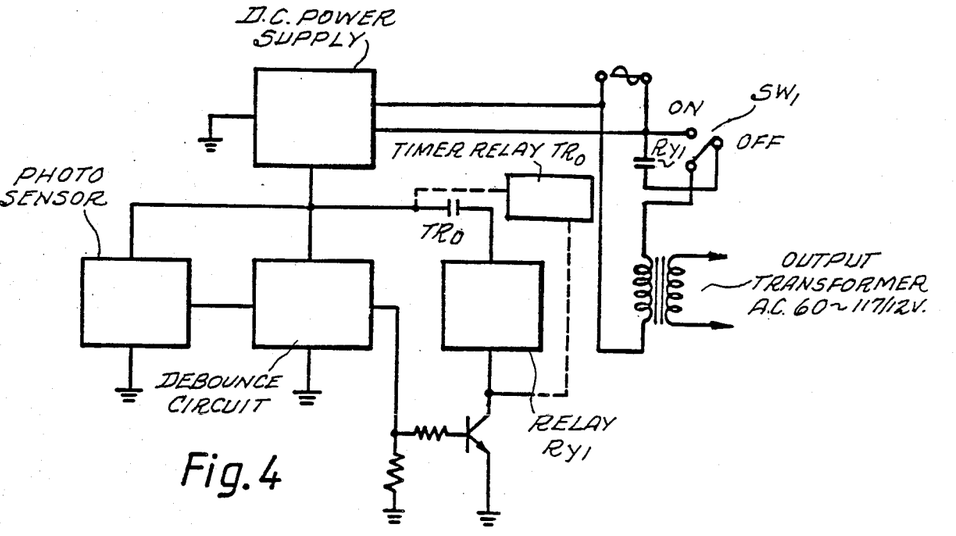
FIG. 4 is the drawing to exemplify the switching on the light in this invention.
Figure 5:
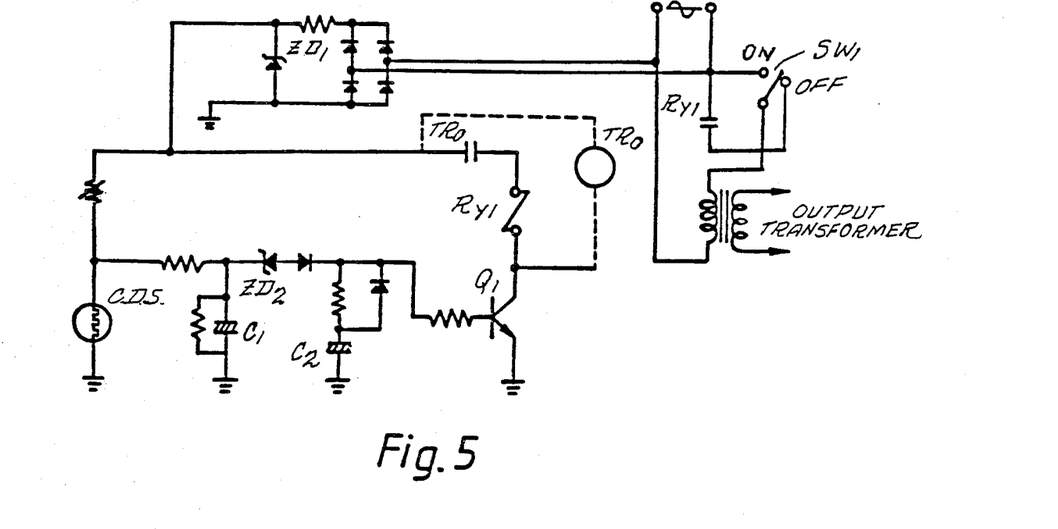
FIG. 5 is the circuit drawing of FIG. 3.

(b) FIG. 4 shows the practical example for light initiation and FIG. 5 is the circuit diagram with DC control source and light detecting device, while without absorbing light through the recognization of debounce circuit, the load transformer will be energized by the relay RY1 NC contact. Through timer TRO, while it absorbs light to produce a time delay to drive RY1 to cause the load transformer to deliver the power.

Figure 6:
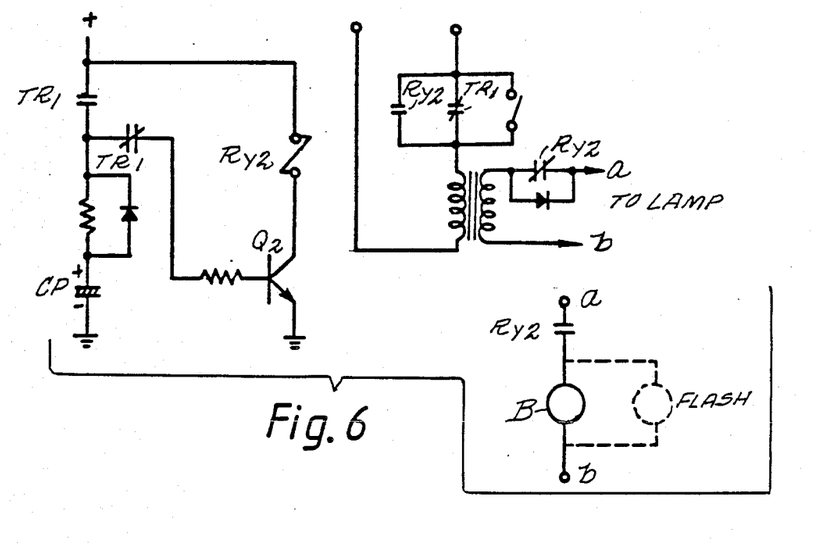
FIG. 6 is the drawing to express the idea on the installation of the warning system in this invention.

(c) This control device is further characterized for the lamp sets to produce brightness, starting and turn-off time for the purpose of presetting and further with an alarming circuit which can turn off the lamp sets in control circuit after the alarming signal in sound or in light variation (such as to cause the lights blink) to warn the people to go away. The practical example as shown in FIG. 6, while TR1 closes, DC source is through TR1 NO contact to charge the capacitor CP, and while reaches at the setting time, the power in capacitor drives the transistor Q2 to turn on RY2 and RY2 NO contacatis in parallel with TR1 on the control section of transformer so that the output of transformer to the lamp sets is dimmed or blinds or to drive the sound alarming device to produce the presetting sound. It can also be operated by the capacitor discharge with the output voltage dropping gradually to cause the light of lamp sets dimming slowly, until all the power in the capacitor discharged completely, then cutting off the supply of transformer, thereby the alarming device is providing the period of buffer time for warning the night wanderers to go away immediately.

Figure 7:
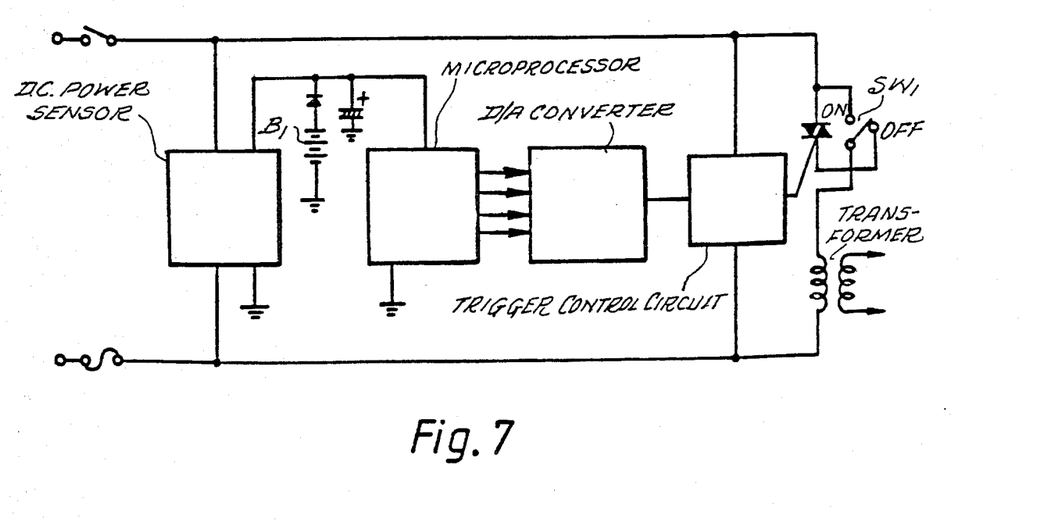
FIG. 7 is the block drawing to express the idea on the controlling system that adopts the micro-processor.
Figure 8:
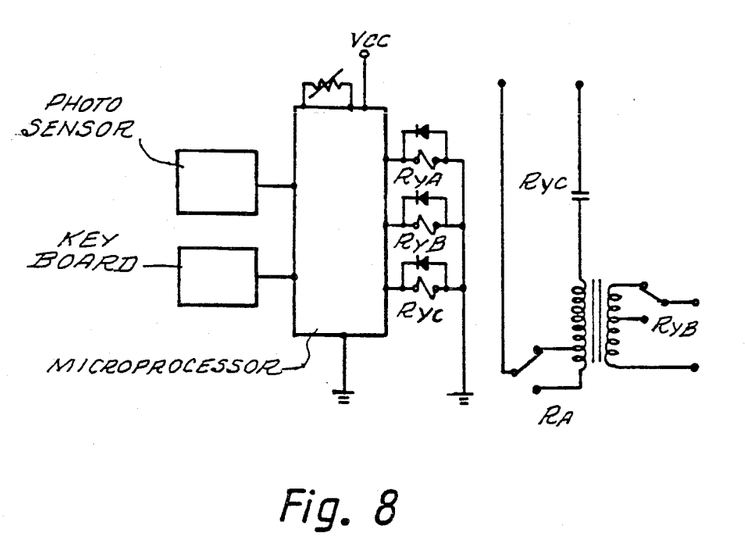
FIG. 8 is the circuit drawing for FIG. 6.
Figure 9:
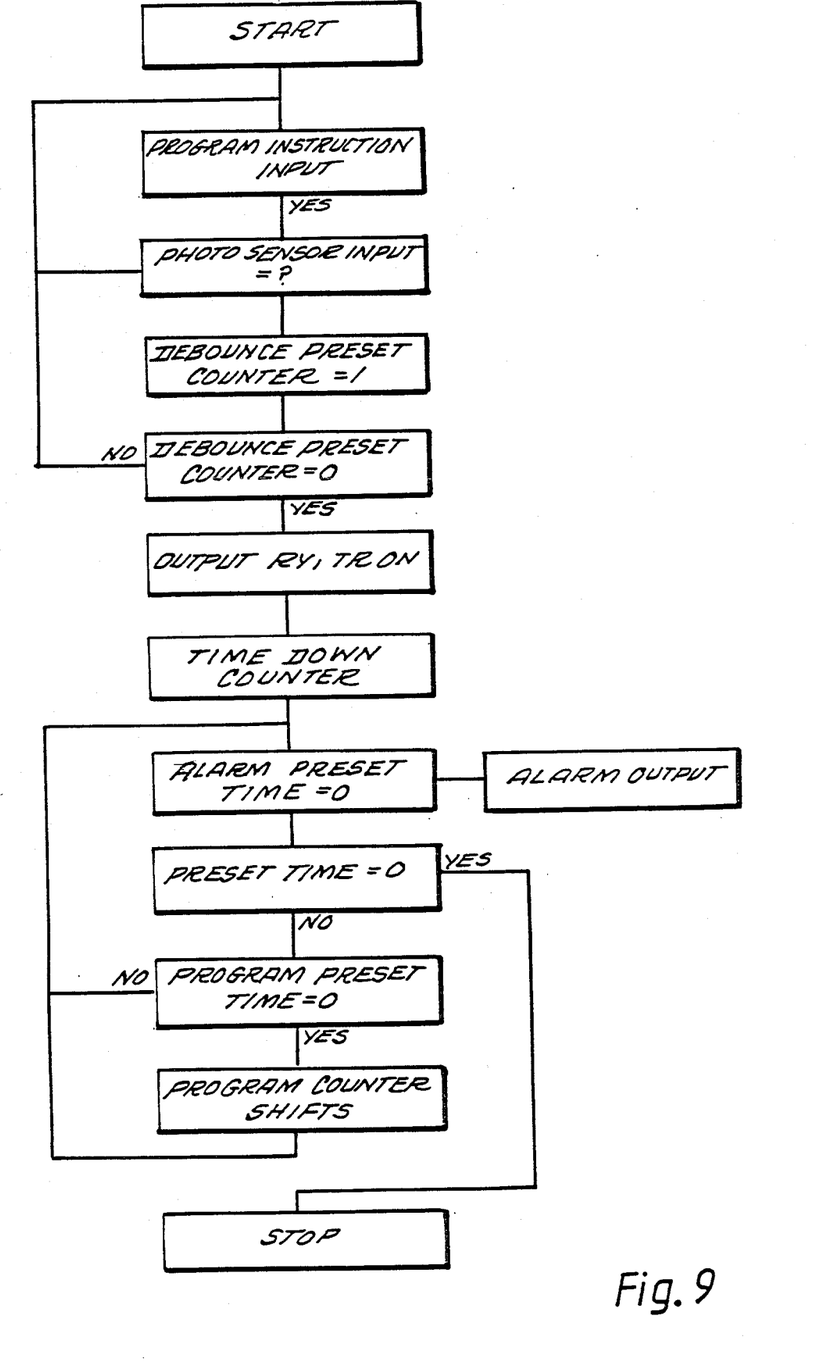
FIG. 9 is the flow chart of movements of FIG. 6.

(d) Normal continuous movable timer is controlled in the way of the above mentioned shortcoming, so that this invention has adopted the presetting timer by utilizing the above mentioned light initiating method and the control function being capable of stepping up, fixed or synchrounous motor-driving timer in cope with the above mentioned starting method and control circuit to produce the output variation in program, The outputs of program are as follows:

(1) Microprocessor controlled method:

Refers to FIG. 7 as shown in the installing block diagram, FIG. 8 is the circuit diagram, FIG. 9 is the action layout chart. The practical example shows the lamp sets for changeable brightness in garden, Settings for turn-on and turn-off and the function of warn signal before cutoff of power, Moreover the input method is as shown in figure by key board, maybe by switch, pin, light effect or other magnetic presetting device.

Figure 10:
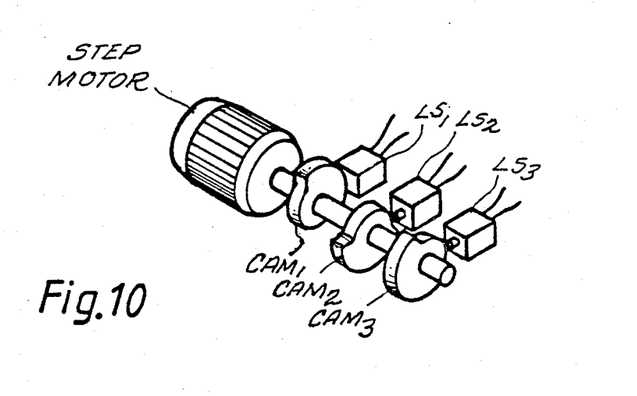
FIG. 10 is to esemplify the convex wheels group and limit suitable that compose the step programmable controlling system.
Figure 11:
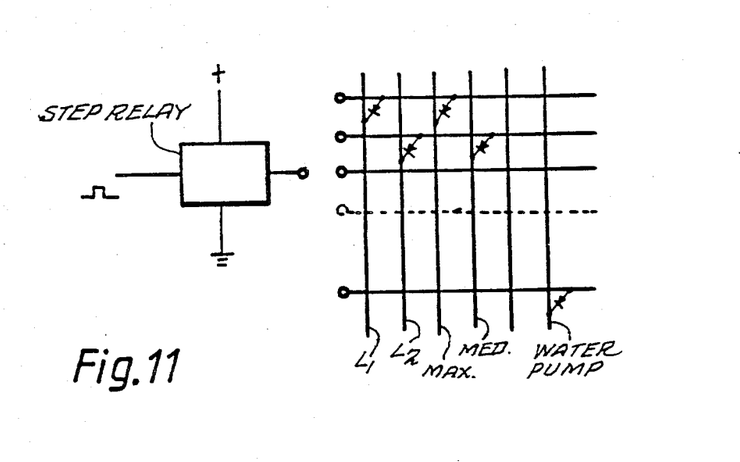
FIG. 11 is to exemplify the step programmable out put by use of the point-to-point distribution formula.

(2) Stepping up program Output:

Is by multiple cams and limit switches to be incorporated in stepping program control device (as FIG. 10) or by contact distributive program matrix method to obtain the stepping up program output (as FIG. 11).

Figures 12, 13, 14, 15:
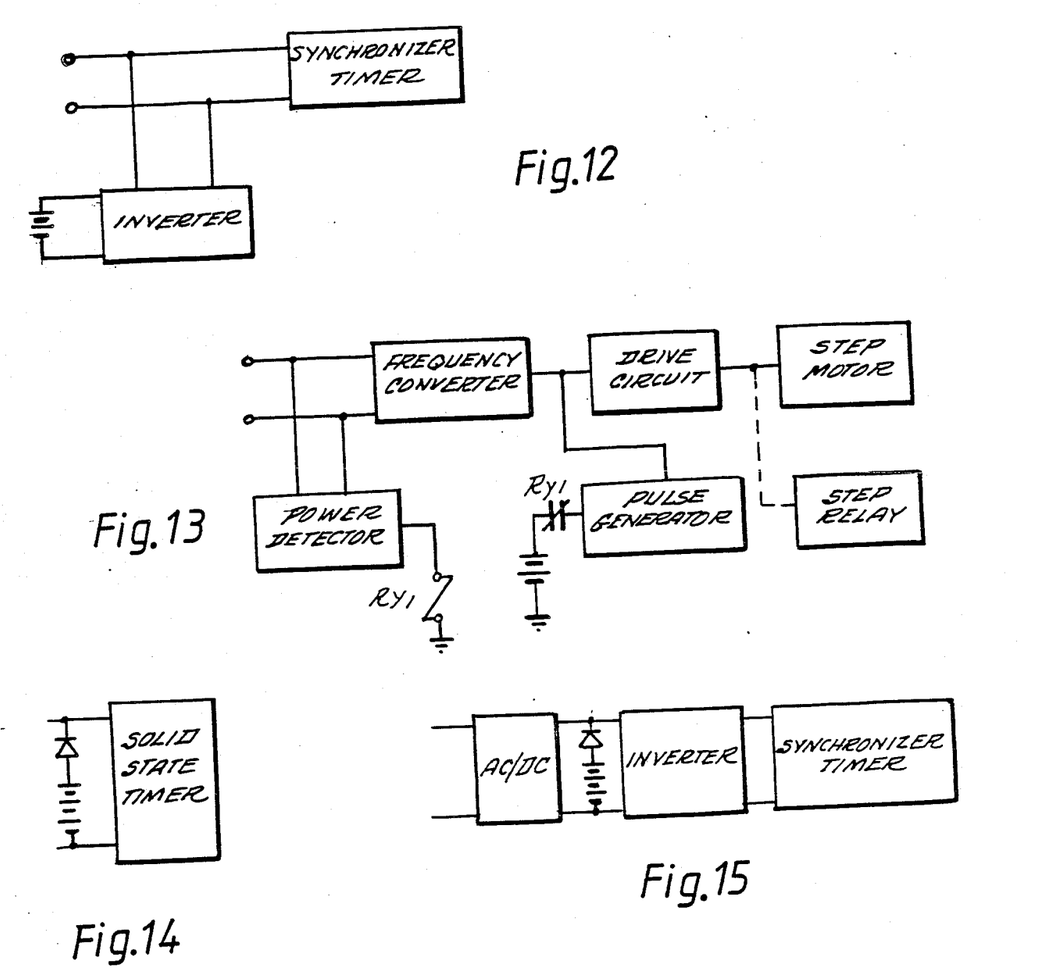
FIG. 12 is the practical example of the parallel relays between the auxilliary power and synchronization motor.
FIG. 13 is the practical example of the step switch of the drive type in non-frequency circuits.
FIG. 14 is the practical example of the solid state type auxilliary power supply installation.
FIG. 15 is the practical example of the drive of synchronization motor by battery sterage the electricity of which is feed by the AC power.

(e) This invention control device is further characterized with anti-power stop device for the avoidance of accidental power stop impairing control function with the methods as follows:

(1) Parallel auxiliary supply:

As shown in FIG. 12 is to connect the power detecting relay RYs, battery with its driving and power similar frequency inverter presetting synchrounous motor in parallel. FIG. 13 shows the example for illiminating the circuit driving stepping up switch as shown in the figure that the anti-power-stop auxiliary supply producing the driving pulsating power. FIG. 14 shows the solid state auxiliary supply device as the practical example. By the above mentioned practical example it shows that this device can supply power duringppower during stop for maintaining the function of control circuit.

Figure 16:
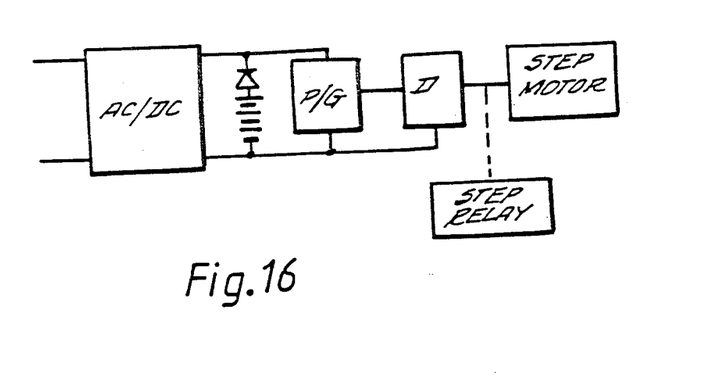
FIG. 16 is the practical example of the pre-set switch of step driven by the auxilliary power of battery storage the electricity of which is feed by AC power.
Figure 17:
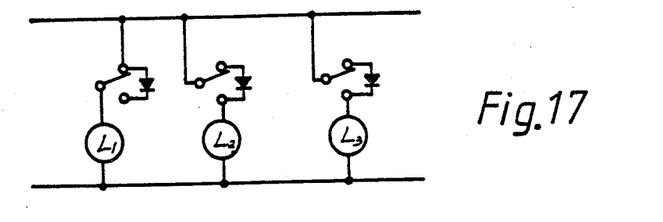
FIG. 17 is a practical example on diode half wave in parallel relay to reduce voltage and to produce variable brightness of the lamp.
Figure 18:
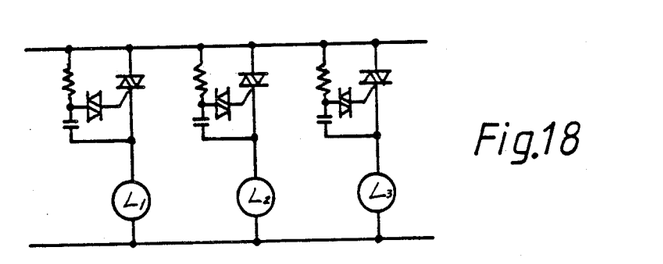
FIG. 18 is the practical example on the variable brightness of the lamp cuased by the phase control of SCR.
Figure 19:
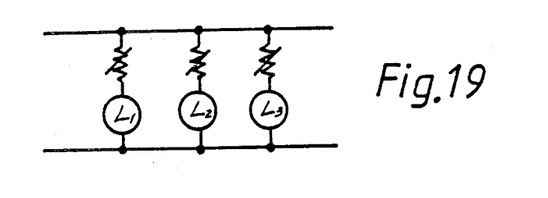
FIG. 19 is the practical example of the variations of lamp brightness produced by the reduction of voltage in parallel relays of the resistance.

(2) Continuous operating method of auxiliary supply: Due to the supply to charge up the auxiliary supply, and from the auxiliary supply through inverter for synchrounous motor to drive (as shown in FIG. 15), or to drive the stepping up presetting timing switch (as shown in FIG. 16) while power stop the battery drives the inverter to get anti-power-stop function. (B) The lamp sets with light variation is divided into different brightness variation functions or with symmetrical variation functions as follows:

(a) Lamp sets with independant brightness variation function, is that lamp sets are installed with separate switching devices by series diode halfwave voltage dropping (as FIG. 17), or by thyresistor phase control (as FIG. 18) or by series resistor voltage dropping (as FIG. 19) to obtain independant light variation function.

Figure 20:
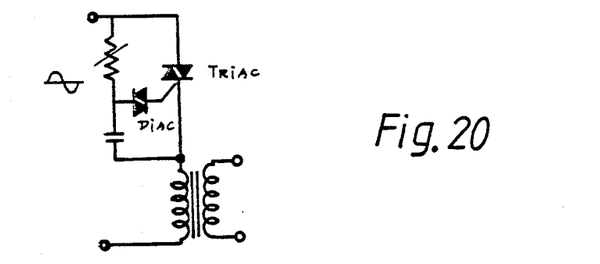
FIG. 20 is the practical example of the variable brightness of the lamp caused by the phese control to the transformer primary by SCR.
Figure 21:
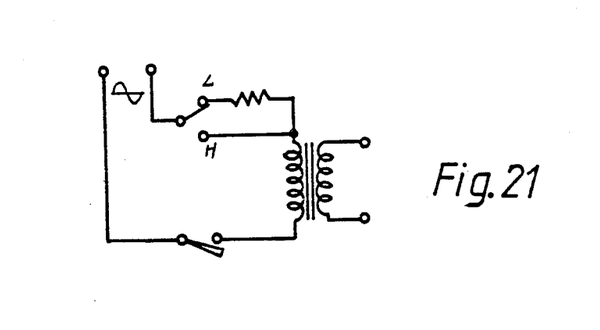
FIG. 21 is the practical example of the variable brightness of the lamp by the lowering of voltage in parallel relay of resistance.
Figure 22:
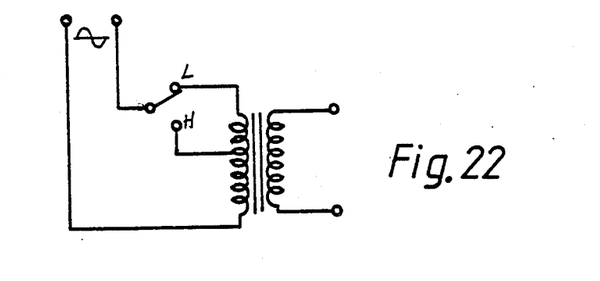
FIG. 22 is the practical example of the variable brightness of the lamp caused by the side turn of the transformer primary.
Figure 23:
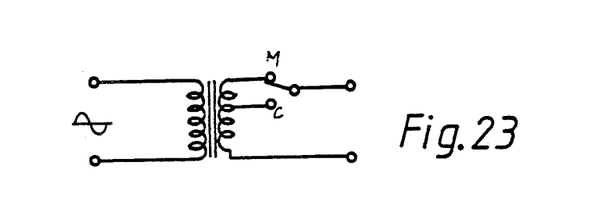
FIG. 23 is the practical example of the variable brightness of the lamp produced by the side turn of the transformer secondary.

(b) All the lamp sets with brightness variation at the same time are by the control device for manual operation or receiving the program control by solid state or electrical-mechanical elements to give the primary side of transformer from thyresistor for phase control (as FIG. 20), or series resistor voltage dropping (as FIG. 21) to obtain the functional operations. It is also possible by switching the taps of the transformer primary (as FIG. 22), or secondary taps switching (as FIG. 23 to obtain the functional requirements).

Figure 24:
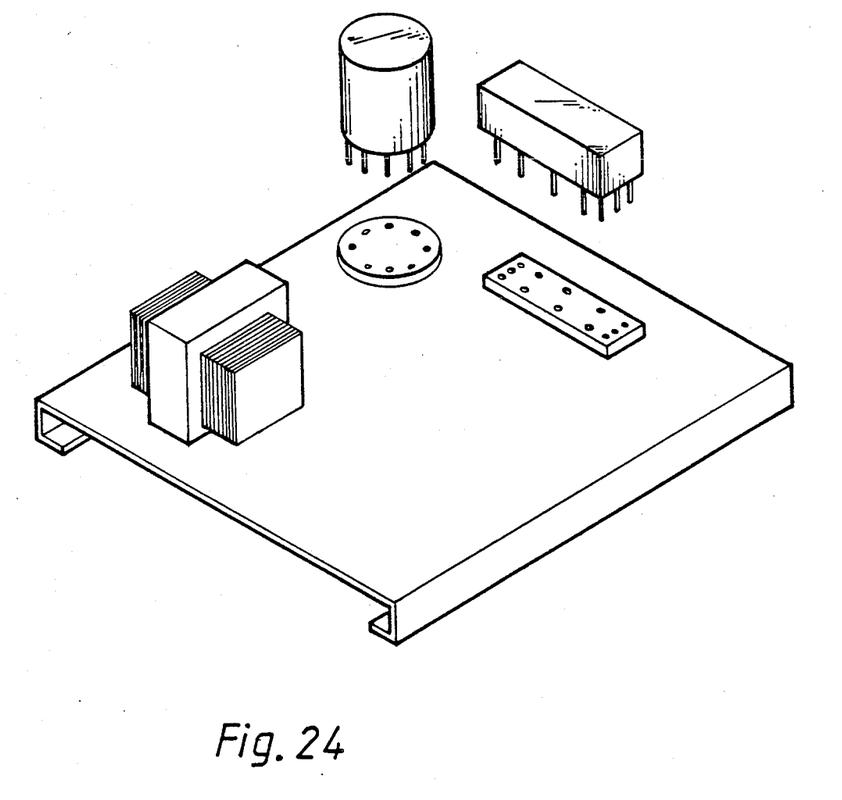
FIG. 24 is the practicaleexample of the controlling system and parts in component type.
Figure 25:
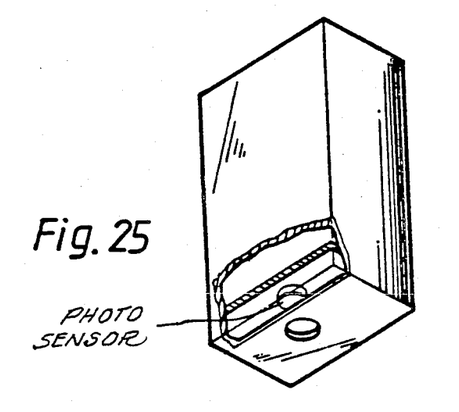
FIG. 25. is the practical example of the inside placement of sensor.
Figure 26:
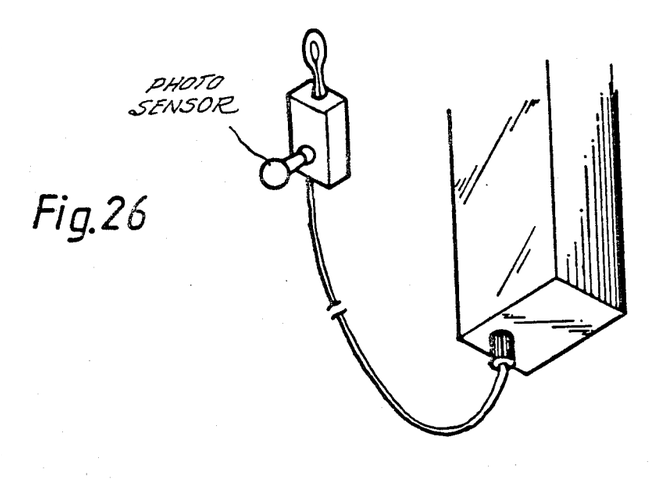
FIG. 26 is the practical example of the outside placement of sensor.

(c) The control device and element composition of this invention is to use consolidated or composite method, among them the consolidated method is generally assembled and subassembled, as for the composite method is that every element has its terminal and on the respective base of the pre-assembled model with their respective sockets to match with, while assembling or replaceing the different functional components (as FIG. 24). The sensor of this design can use built-in or external design as FIG. 25 shown that the sensor is placed in a box and on the protection box with light holes for light penetrating into the box for function of sensor operation. FIG. 26 shows the sensor placed externally that the sensor is connected in the circuit through leading wires and plug assembly, it is possible to lead the sensor to the outside or to other suitable position; another special feature for sensor is through omni-directional assembly structure feature fixed on the box to cause the sensor for appropriate direction adjustment to facilitate the sensing of light.

I claim:

1. An apparatus for controlling at least one illuminating lamp comprising:

illuminating lamp means for producing an illumination in response to an illuminating signal applied thereto;

light sensing means for generating a first output signal when an ambient illumination level has fallen below a predetermined level;

RC circuit means, coupled to said first output signal, for charging with a predetermined time constant when said first output signal is produced, to produce a charging signal indicative of an amount of charge;

zener diode means, coupled to said charging signal, for conducting only when a voltage of said charging signal exceeds a threshold, said zener diode means producing a second output signal as a result of said conducting, said second output thereby being produced at a predetermined time after said first output signal is produced; and switching means for supplying said illuminating signal to said illuminating lamp means, when said second output signal is generated by said zener diode means, and said first output signal is also present.

2. An apparatus as in claim 1 further comprising timing means for removing said signal from said illuminating lamp means after a second predetermined period to time elapses after said zener diode means generates said second output signal.

3. An apparatus as in claim 1 further comprising warning means for issuing a warning prior to removing said signal from said illuminating lamp means.

4. An apparatus as in claim 3 wherein said warning means includes means for producing an audible sound.

5. An apparatus as in claim 3 wherein said warning means includes means for varying the intensity of the illumination produced by said illuminating lamp means.

6. An apparatus as in claim 4 wherein said intensity-varying means includes means for alternating said illumination produced by said illuminating lamp means between two different intensity levels.

7. An apparatus as in claim 6 wherein said level-alternating means includes:
   means, having first and second characteristic states, for alternating between said first and second states;
   memory means for controlling the duration of said alternation of said alternating means; and
   means for changing the amplitude of said signal applied to said illuminating lamp means in response to state altenations of said alternating means.

8. An apparatus as in claim 2 wherein said timing means is implemented by a programmable microprocessor.

9. An apparatus as in claim 1 further comprising:
   power supply means, coupled to an external alternating current power source, for providing power to said light sensing means, RC circuit, zener diode, means and switching means; and
   backup power means for providing backup power to said light sensing means, RC circuit, zener diode means and switching means whenever said alternating current power source ceases to produce power.

10. An apparatus as in claim 1 wherein:
    said illuminating lamp means includes a plurality of illuminating lamps; and
    said apparatus further comprises brightness means for independently controlling the brightness of illumination of each of said plural illuminating lamps.

11. An apparatus as in claim 10 wherein said timing means, and brightness means are implemented by a programmable microprocessor.

12. An apparatus as in claim 1 wherein said light sensing means comprises a CDS photosensitive cell.

13. An apparatus as in claim 1 wherein said RC circuit means includes:
    a first resistor connected at a first terminal thereof to said first output signal; and
    a first network having a predetermined amount of capacitance and a predetermined amount of resistance connected between a second terminal of said first resistor and a ground terminal;
    and said zener diode means inclueds:
    a Zener diode, the cathode of which is connected to said first resistor second terminal;
    a first diode connected in series with said Zener diode, the anode of said first diode being connected to the anode of said Zener diode;
    a second resistor connected to the cathode of said first diode;
    solid state control means, operatively connected to said first timing means, for actuating said RC circuit means to begin timing said first predetermined time in response to current flowing through said second resistor; and
    a second network connected between the cathode of said first diode and said ground terminal, comprising:
    a capacitor, one terminal of which is connected to said ground terminal,
    a third resistor connected between said first diode cathode and another terminal of said capacitor, and
    a second diode connected in parallel with said third resistor, the anode of said second diode being connected to said capacitor another terminal, the cathode of said second diode being connected to the cathode of said first diode.

14. An apparatus as in claim 1 wherein said switching means includes:
    a switching transistor having a control terminal and first and second switching terminals, the control terminal thereof being connected to said second output signal; and
    a relay including a coil energized by said switching transistor control terminals, and further including a set of contacts which apply a current to said illumination lamp means when said coil is energized.

15. An apparatus as in claim 1 wherein said first timing means includes means for providing a timing delay.

* * * * *